United States Patent [19]
Bailey

[11] 3,739,871
[45] June 19, 1973

[54] MAPPING OF EARTH FRACTURES INDUCED BY HYDRAFRACTURING

[75] Inventor: John R. Bailey, Tulsa, Okla.
[73] Assignee: Senturion Sciences, Inc., Tulsa, Okla.
[22] Filed: July 30, 1971
[21] Appl. No.: 167,573

[52] U.S. Cl. .............. 181/.5 NP, 175/1, 166/250, 166/308, 340/18 P, 181/.5 BE
[51] Int. Cl. ................. G01v 1/40, E21b 47/026
[58] Field of Search ............ 175/1; 166/308, 42, 166/177, 250; 340/15.5 SC, 18 P, 18 NC; 181/.5 BE, .5 NP

[56] References Cited
UNITED STATES PATENTS

| | | | |
|---|---|---|---|
| 3,427,652 | 2/1969 | Seaz | 166/308 |
| 3,430,193 | 2/1969 | Lindberg et al. | 340/15.5 SE |
| 3,586,105 | 6/1971 | Johnson | 166/308 |
| 3,295,100 | 12/1966 | Armistead | 340/18 P |

Primary Examiner—Benjamin A. Borchelt
Assistant Examiner—J. V. Doramus
Attorney—James R. Head and Paul H. Johnson

[57] ABSTRACT

In the process of inducing fractures in the earth in the vicinity of a bore hole, fluid under high pressure is pumped down the well bore, and a portion of the wall of the well bore is exposed to this pressure at a known position in the earth. As the fluid pressure is increased, the rock will part, or rupture, and form a fracture. As the fluid rapidly flows into this fracture the pressure sharply falls, and this drop in pressure is transmitted to the surface, where at some time later, the pressure in the well fluid at the surface will show a corresponding drop.

Sensors are placed in the earth around the well bore to receive the seismic wave that is generated by the rock fracture. The times of arrival of the seismic wave can be determined from a display, and the average velocity of seismic waves in the earth can be determined.

As the flow of fluid continues, the pressurized fluid flows into the fracture, causing it to widen and extend to greater distances from the well bore. This extension is discontinuous and intermittent, involving additional rock fractures and corresponding seismic signals. The times of arrival of the later fracture signals are determined. From these determinations and the previously determined velocity of seismic waves, the position in the earth of the successive fractures are determined.

21 Claims, 5 Drawing Figures

MAPPING OF EARTH FRACTURES INDUCED BY HYDRAFRACTURING

BACKGROUND OF THE INVENTION

1. Field of the Invention

This invention is in the field of seismic mapping of the earth. More particularly, it is concerned with the problem of determining the position, in the earth, of the fractures which are induced in the rock near the bore hole by the application of high fluid pressures to the rock wall of the bore hole.

2. Description of the Prior Art

It has been common in production of petroleum from the earth to fracture the rock in the vicinity of a well bore by the application of high pressure fluid. This art is known by the trademark name "Hydrafrac," and millions of wells have been treated by this process. One of the major problems involved is the determination of the precise position in the earth of the fracture. To do this, instruments have been developed and used which determine (by photographic and mechanical means) the position in the well bore, at the rock face, the start of the fracture. But, of course, this does not give any information of the position of the fracture away from the well bore.

Also, in the general studies of seismology, attempts have been made to determine the position in the earth of the focus of an earthquake. While this process is similar in some respects to this present invention, the precise steps of the present invention have not heretofor been known or used.

SUMMARY OF THE INVENTION

The limitations of the prior art are overcome in this invention by utilizing a means to determine the time and place of occurrence of the first fracture, from which the average velocity of propagation of the seismic waves from the first fracture can be determined. Normally, this will be the same over the paths to all the sensors. If they are not all the same, they can each be used to determine the distance from subsequent fractures to each of the sensors.

It is, therefore, an important object of this invention to provide a method by which the precise position and size of a fracture induced in the rocks of the earth near a bore hole can be determined.

These and other objects and a full understanding of the principles of this invention will be apparent from the following description taken in conjunction with the appended drawings, in which:

DESCRIPTION OF THE PREFERRED EMBODIMENT

Figure 1:
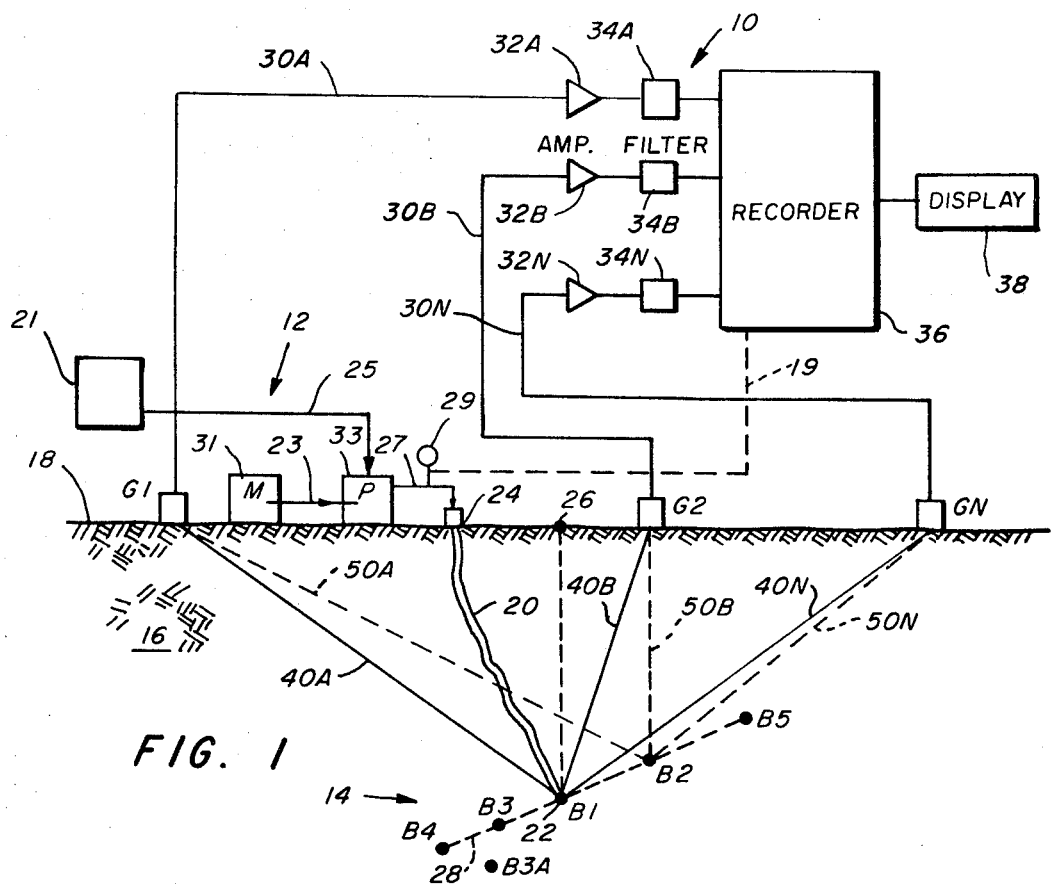
FIGS. 1 and 2 show in schematic form the elevation and plan views of the apparatus and well bore used in this invention.
Figure 2:
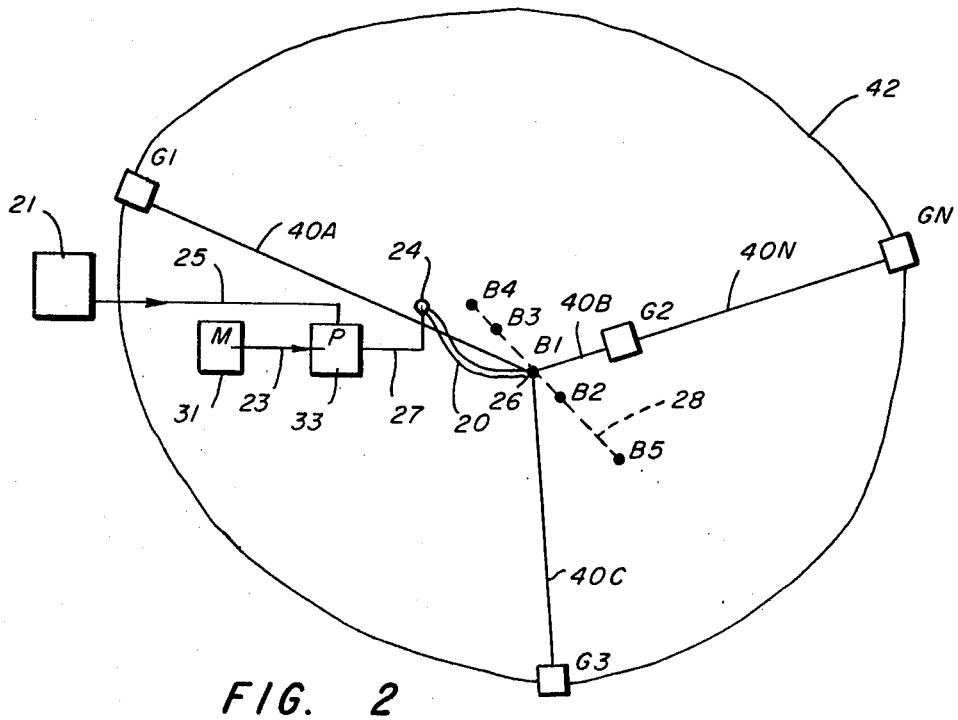

Referring now to the drawings, FIGS. 1 and 2 show in elevation and plan, respectively, one embodiment of this invention. The instruments are represented generally by the numeral 10, the hydraulic system by 12 and the subsurface well and fracture by 14. The earth is represented by numeral 16, with surface 18. The well 20 starts at the surface at well head 24, and terminates at the bottom 22. The position of point 22 is generally known from surveys of the well bore. In creating a fracture 28 at the point 22, a selected fluid, with special properties, which are well known in the art, and which form no part of this invention, is brought to the inlet of pump 33 from tank 21 by pipe 25. The pump 33 is driven by motor or engine 31 through means 23. The fluid leaves the pump by pipe 27 and enters the casing at the well head 24. A pressure gauge 29 indicates the pressure in the pumped fluid entering the well. An indication of this pressure, in the form of an electrical signal, is continuously recorded at recorder 36, over leads 19, or by telemetry, as is well known in the art.

The high pressure fluid is pumped into the well, either through tubing inserted into the well, or through the casing. At the point 22, the rock wall is exposed to the fluid pressure. As the pressure builds up, the rock will split, or fracture, forming a narrow crevice. As pumping continues, the fluid pushes the walls of this crevice farther apart, and the crevice or fracture progresses farther from the well. As the rock splits and the crevice opens wider, a sharp elastic wave, or seismic signal, is generated, which travels as a spherical wave front outward from the point of generation, or the source of the seismic wave. This fracturing process is a discontinuous process. Tensile stresses build up in the rock and increase until the rock fails. This releases the strain at that point, but as the flow of the pressurized fluid continues, the strain builds up at another point until the rock fails again at that point. As the fracture progresses outwardly from the well bore, seismic signals will be generated at points at increasingly greater radius from the well.

The object of this invention is to determine the times of failure, and the positions of failure, of the rock, so that the progress of the fracture can be mapped, and the position, size, and orientation of the fracture can be determined.

The seismic signals generated at the points of rock failure travel outwardly in a spherical wavefront. This wavefront can be detected by positioning vibration sensors or geophones in known positions around the known position of the point of application of pressure 22. These sensors or geophones are shown as G1, G2 ... GN. They are shown for convenience as positioned on the earth's surface, although they can equally well be positioned below the surface, as will be explained in connection with FIG. 4. The geophones are connected by leads 30A, 30B ... 30N, (or by telemetry) respectively to separate amplifiers 32A, 32B ... 32N, and to filters 34A, 34B ... 34N, and to a recorder means 36. This is generally a type of recorder, such as a magnetic recorder, that can phonographically reproduce the originally recorded electrical signals. Thus, the recorder 36 can be played back and the signals displayed on display unit 38. One form of display will be explained in connection with FIG. 3.

Figure 3:
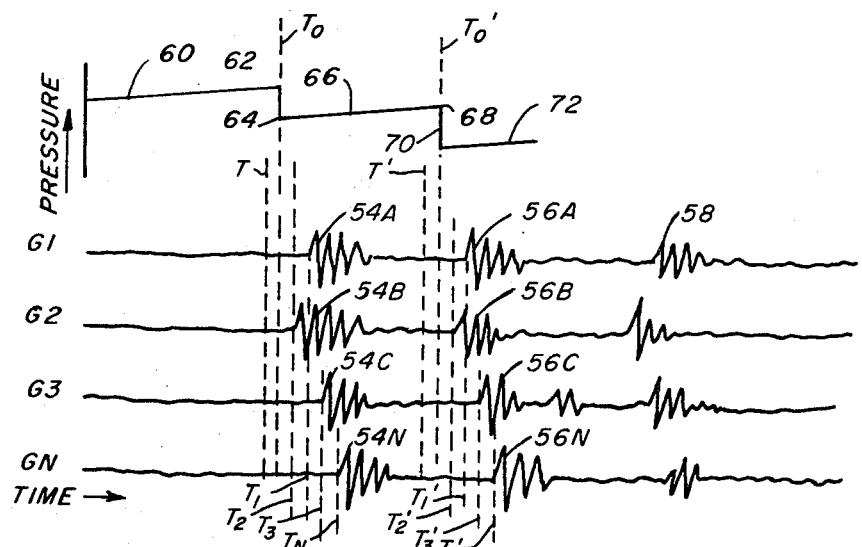
FIG. 3 illustrates one type of display of the data recorded in the method of this invention.

As the pressurized fluid is pumped into the well, at the start, the well fills up with fluid, and the pressure then begins to increase. As the pressure rises, the strain builds up in the rock, and finally the rock breaks, the fracture opens, and fluid flows into the fracture. This reduces the pressure at the point of fracture, and this reduction in pressure travels as a rarefaction wave up the well, through the fluid, to the well head, where the pressure gauge 29 will show a sudden drop. This is illustrated in FIG. 3 which shows a portion of a display 38. The traces labelled G1, G2 . . . GN represent the electrical signals from the geophones. They are plotted with increasing time to the right. At the upper part of the figure is a trace 60 which represents the pressure indicated by gauge 29. The pressure is shown as rising along curve 60 until time To when the rarefaction wave arrives at the pressure gauge. Knowing the length of the fluid column and the velocity of elastic waves in the fluid, the time of travel of the rarefaction wave in the pipe can be determined. A time T is set, ahead of To by the magnitude of this travel time. T is therefore the time of initiation of the seismic signal due to the first fracture at B1.

The events marked 54A, 54B, . . . 54N are the arrivals at the sensors of the seismic signal from the first fracture at B1. The time differences (T1−T), (T2−T) . . . (TN−T) etc. are the travel times of the seismic signal from point 22 to each of the geophones. On the assumption that the earth is isotropic in the region of interest, the average velocity of travel of seismic waves in the earth can be determined by dividing the distances 40A, 40B . . . 40N, from point 22 to each sensor, by the times (T1−T), (T2−T), (TN−T) respectively, thus.

$$V = (40A)/(T1-T) = (40B)/(T2-T)$$

etc.

As the pumping continues the fracture that has been formed at B1 becomes filled and the pressure builds up again until at time (To′) there is another drop in pressure at the gauge, indicating another time (T′) at which a second fracture occurs at some such point as B2. The seismic signals generated at B2 are recorded as 56A, 56B . . . 56N on the display, at times T1′, T2′ . . . TN′ etc. From the measured times (T1′−T′), (T2′−T′) etc. and the average velocity $V$ determined from the events 54, distance 50A, 50B . . . 50N can be calculated. These should, within the range of experimental error, define the point B2. As the process continues, other points B3, B4, B5, etc., will be determined as additional points on the fracture 28. Also, there may be a point such as B3A which is displaced from the dashed line 28. This would indicate that the fracture has substantial width, and that points B3 and B3A represent points at about the same radius from the well but at different positions on the surface of the fracture.

Figure 4:
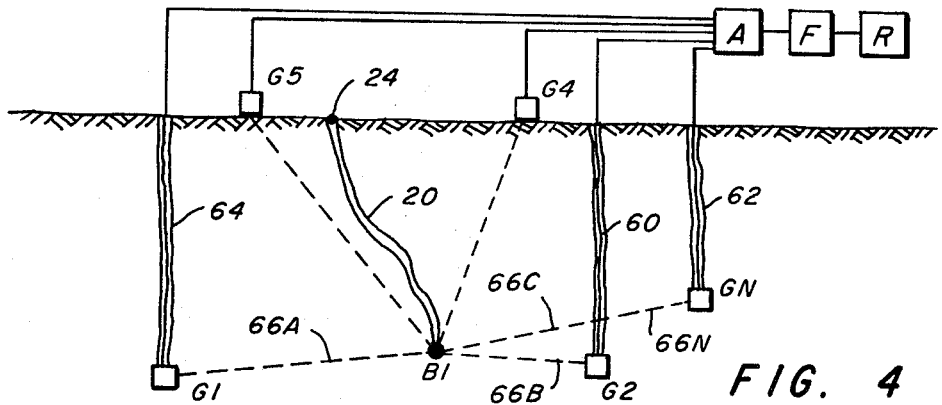
FIG. 4 illustrates the case where the sensors are positioned in deep well bores.

It is obvious that the distances 40 and 50 must be considered in three dimensional space. Also, while there are shown only four separate sensors, this is by way of illustration, and many more sensors can, and should, be used. In general, the more sensors, the better is the average determination of the position of the points B2, B3, etc. The sensors can be positioned on the surface 18, or they can be buried below the surface, as is well known in seismic technology, to reduce the seismic noise present at the surface. They can also be placed in deep well bores such as 60, 62, 64, etc. FIG. 4 when they are available. The combination of subsurface and surface sensors shown in FIG. 4 is particularly advantageous.

The sensors can conveniently be pressure responsive, or vertical component vibration detectors, or horizontal component detectors, etc.

FIG. 3 illustrates an idealized display of the traces of the sensors. It will be noticed that, because of the difference in path lengths from B1 to each sensor, the times T1, T2 . . . TN are not the same. This is quite proper. Also, when the subsequent events 56 representing seismic signals from source B2, for example, are recorded, they will show substantially the same time pattern T1′, T2′ . . . TN′, provided that the distance from B2 to B1 is small compared to the distances 40, 50. Knowing the pattern of reception times of the signal from B1, it can be used to enhance the signals subsequently received by searching for lineups of events on the traces in the same time pattern. Also, stacking or adding of the traces, after shifting by the time pattern, will provide an enhanced characteristic signal, as is well known in seismic prospect. Having the best picture of the waveshape of the received signal, harmonic analysis can be made. This should indicate the characteristic frequency of the received signal. Knowing this characteristic frequency it is possible to design a narrow bandpass filter to pass the signals and exclude noise. This will serve to provide a display FIG. 3 of higher signal-to-noise ratio, from which more precise determinations can be made of the times of arrival of the signals.

The need for a high signal-to-noise ratio display of the received seismic signals is that precise determinations of position require precise determination of the times of arrival at each of the sensors of the seismic waves generated at the first and subsequent fractures, and these times of arrival can best be determined when the events are clearly evident and not obscured by noise.

Figure 5:
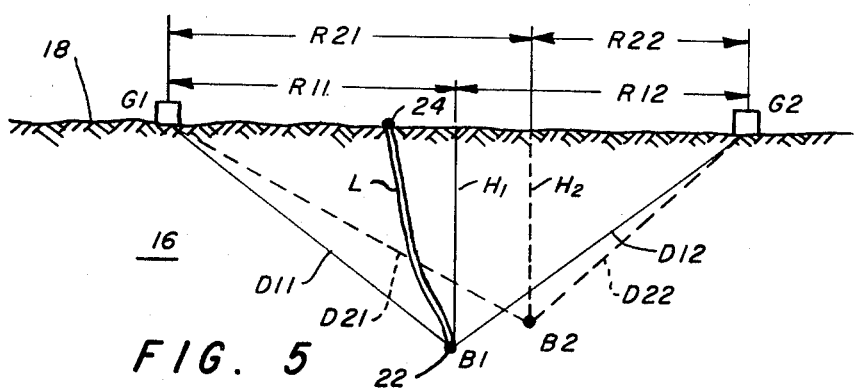
FIG. 5 illustrates the geometry of the fractures and sensors in practicing this invention.

Consider the schematic illustration of FIG. 5 which illustrates the case where B1, B2, G1, and G2 are all in one vertical plane. Assume:
1. The earth is isotropic.
2. $v$ = the velocity of acoustic waves in the well fluid.
3. L = length of fluid column in the well.
4. $V$ = the velocity of seismic waves in the earth.
5. B1 is the point of first fracture and its position is known.
6. B2 is the point of second fracture, and its position is to be determined.
7. Distances R11, R12, D11, D12, H1 are all known.
8. To and To′ are times of pressure drop at the surface from B1 and B2, and are known.
9. T and T′ are times of pressure drop at B1 and B2, and are to be determined.
10. T11, T12 are times of arrival of seismic waves from B1 at G1 and G2 and are known.
11. T21, T22 are times of arrival of seismic waves from B2 at G1 and G2 and are known.
12. D21, D22, H2, R21, R22 are to be determined.

Knowing H1, R11, R12, then D11 and D12 can be determined.

Time of travel of acoustic wave in the well fluid is
$To-T = L/v$, and $T = To-L/v$
$(T11-T) = D11/V$, or
$V = D11/(T11-T)$ and
$V = D12/(T12-T)$ etc.

Now, knowing $V$, and $To'$, $T21$, $T22$, etc. $T' = T1-L/v$
$(T21-T') = (D21)/V$ or
$D21 = (T21-T')V$ and
$D22 = (T22-T')V$, etc.

Also, $(H2)^2 = (D22)^2 - (R22)^2$
$(H2) = (D21) - (R21)$
$(R22) + (R21) = (R12) + (R11)$ From these three equations in three unknowns $R22$, $R21$, and $H2$ can be determined, and thus, the coordinates of point B2 can be determined. The same process would apply in three dimensional space, where coordinates $x, y, z$ of each point are either known or to be determined.

The preceding analysis has been made on the basis that the position in the earth, and the time of occurrence of the first fracture are both known. However, while it simplifies the problem to know the time of occurrence, this information is not absolutely necessary. Consider the case illustrated in FIG. 5, except that $To$ and $To'$ are not known. It is possible to choose various values of time, $T$, such as TA, TB, etc. such that $$V1 = D11/(T11-TA)$$
$$= D12/(T12-TA), \text{ etc.}$$

When the same value of $TA$ substituted in these equations gives the same value of $V1$ for all paths from B1 to all sensors, then that value of $V1$ is probably a good approximation to the true value of average velocity for the earth in that region. Thus, this value of $V1$ can then be used to calculate the position of the next fracture B2, as in the case previously described.

While the general term of "sensor" has been used to describe the devices which are used to detect the seismic waves, they can be of many different types, as is well known in the geophysical art. Thus they may be pressure transducers, accelerometers, conventional seismometers, or geophones, which are velocity vibration transducers. They can be designed to be primarily sensitive to vertical or horizontal particle motion, etc. Also, the well head can be on dry land, or can be at a location where the land is covered by a water layer. In such cases the sensors can be suspended in the water, or they can be positioned on the earth-water interface.

In general, the horizontal dimension of the array of sensors should be at least as great as the depth of the fracture below the surface. Of course, some sensors can, and should, be placed within the perimeter of this array, and preferably close to a point above the point of application of pressure. This will provide a more precise value for the depth of the fracture. Also the distance from B1 and BN to the edges of the array should be large compared to the distances between B1 and BN.

While this invention has been described in terms of an instrumental system in which the sensors are connected by wire to a common recorder, their signals can, of course, be transmitted by radio or other means to the central recorder. Conversely, separate recorders can be used in connection with each sensor or with a group of sensors.

While this invention has been described with some particularity, it will be clear that from the principles which have been described, one skilled in the art will be able to devise many other embodiments, all of which are considered to be part of this invention which is not to be limited to the abstract, the description or the drawings, but is to have the scope of the appended claim, or claims, when construed to the full equivalents of each element.

What is claimed:

1. In the process of fracturing earth rock formations by pumping under pressure a selected fluid into a bore hole to a depth selected to induce said fracture, the position in the earth of the point of application of pressure being known,
   the method of mapping the fracture induced in the rocks in the vicinity of said point application,
   comprising the steps of:
   a. placing a plurality of sensors in the earth in a pattern around said point of application, said sensors adapted to detect and transduce vibrations of the earth, caused by said inducement of said fracture, to corresponding electrical signals;
   b. pumping said fluid under pressure into said bore hole to induce a first fracture of the rock at said point of application of said fluid pressure;
   c. amplifying said electrical signals;
   d. recording as a function of time said amplified signals; and
   e. continue pumping said fluid under pressure to induce a second fracture of said rock and repeating steps (c) and (d).

2. The method as in claim 1 including the additional step of recording as a function of time the pressure in said pressurized fluid at the top of said bore hole.

3. The method as in claim 2 including the additional step of determining from said recorded pressure the time of occurrence of a sharp pressure drop corresponding to the time of fracturing, at said point of application.

4. The method as in claim 3 including the step of determining from the known length of bore hole from the top of the bore hole to the point of application of pressure, the time of travel of the rarefaction wave from said fracture initiation to the surface pressure gauge, whereby the time of the first fracture initiation can be determined.

5. The method as in claim 4 including the step, from the known position and known time of the first fracture, of determining the average velocity of propagation of seismic waves in the earth in the vicinity of said well bore.

6. The method as in claim 5 including the step, from the known average seismic velocity, and the times of arrival of seismic signals from a second fracture, of determining the position of said second fracture.

7. The method as in claim 2 in which the pressurized fluid is transmitted to the formation by means of tubing in the bore hole, and including the additional step of creating a sudden release of pressure at the bottom end of the tubing, while recording the amplified transduced signals and the surface pressure.

8. The method as in claim 1 wherein the sensors as at the surface of the earth.

9. The method as in claim 1 wherein the sensors are buried below the surface of the earth.

10. The method as in claim 1 wherein at least part of the sensors are positioned in deep bore holes surrounding the pressurized bore hole.

11. The method as in claim 1 wherein the sensors are vertical component geophones.

12. The method as in claim 1 wherein at least part of the sensors are horizontal component geophones.

13. The method as in claim 1 wherein the surface of the earth at the bore hole has an overlying layer of water and the sensors are positioned in the water.

14. The method as in claim 1 wherein the horizontal dimension of the pattern of sensors is at least as great as the depth of said point of application.

15. The method as in claim 1 including the additional step of closing the well bore under the pressure of the pressurized fluid and continuing to record said signals.

16. The method as in claim 1 including the additional step of determining the pattern of the times of arrival of the fracture initiation at each of the sensors.

17. The method as in claim 16 including the step of correlating each of the recorded traces in pairs.

18. The method as in claim 1 including the additional steps of making an harmonic analysis of the received signals, determining the characteristic frequency of said signals, and filtering said recorder traces with a band-pass filter including said characteristic frequency.

19. The method as in claim 16 including the steps of shifting each of a plurality traces in accordance with said pattern so that all of the signals on said traces are in coincidence, and adding said shifted traces to provide a sum trace.

20. The method as in claim 1 including the additional steps of:
 a. selecting a time of fracture at said first fracture;
 b. from the known distances from the point of first fracture to each of said sensors and the times of arrival of said vibrations at said sensors calculating the average velocity of propagation of said vibrations through the earth;
 c. comparing the values of average velocity for each of the paths to each sensor; and
 d. repeating steps (a), (b) and (c) until said calculated average velocity is substantially the same for each said path.

21. The method as in claim 20 including the additional steps of:
 a. selecting a time of fracture at said second fracture;
 b. from the known average velocity and the known times of arrival of said vibrations at said sensors calculating the distance from each of said sensors to the position of said second fracture;
 c. determining the position of said second fracture; and
 d. repeating steps (a), (b), and (c) until sequential values of said position are substantially the same.

* * * * *